Aug. 21, 1951 E. H. COMPTON 2,565,169
CUTTING MACHINE
Filed Dec. 4, 1947 5 Sheets-Sheet 1

Inventor
Edward H. Compton

By *Clarence A. O'Brien and Harvey B. Jackson*
Attorneys

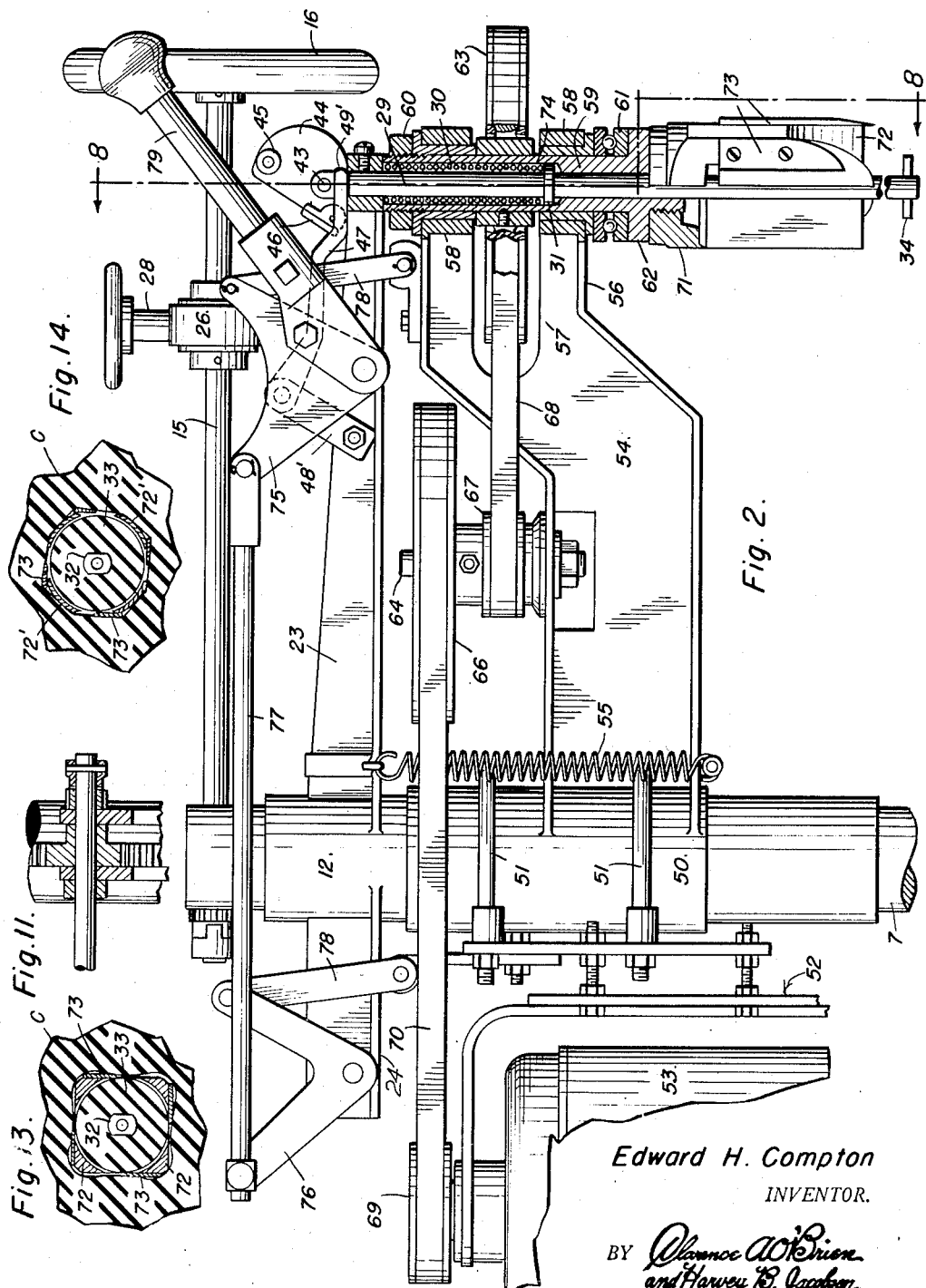

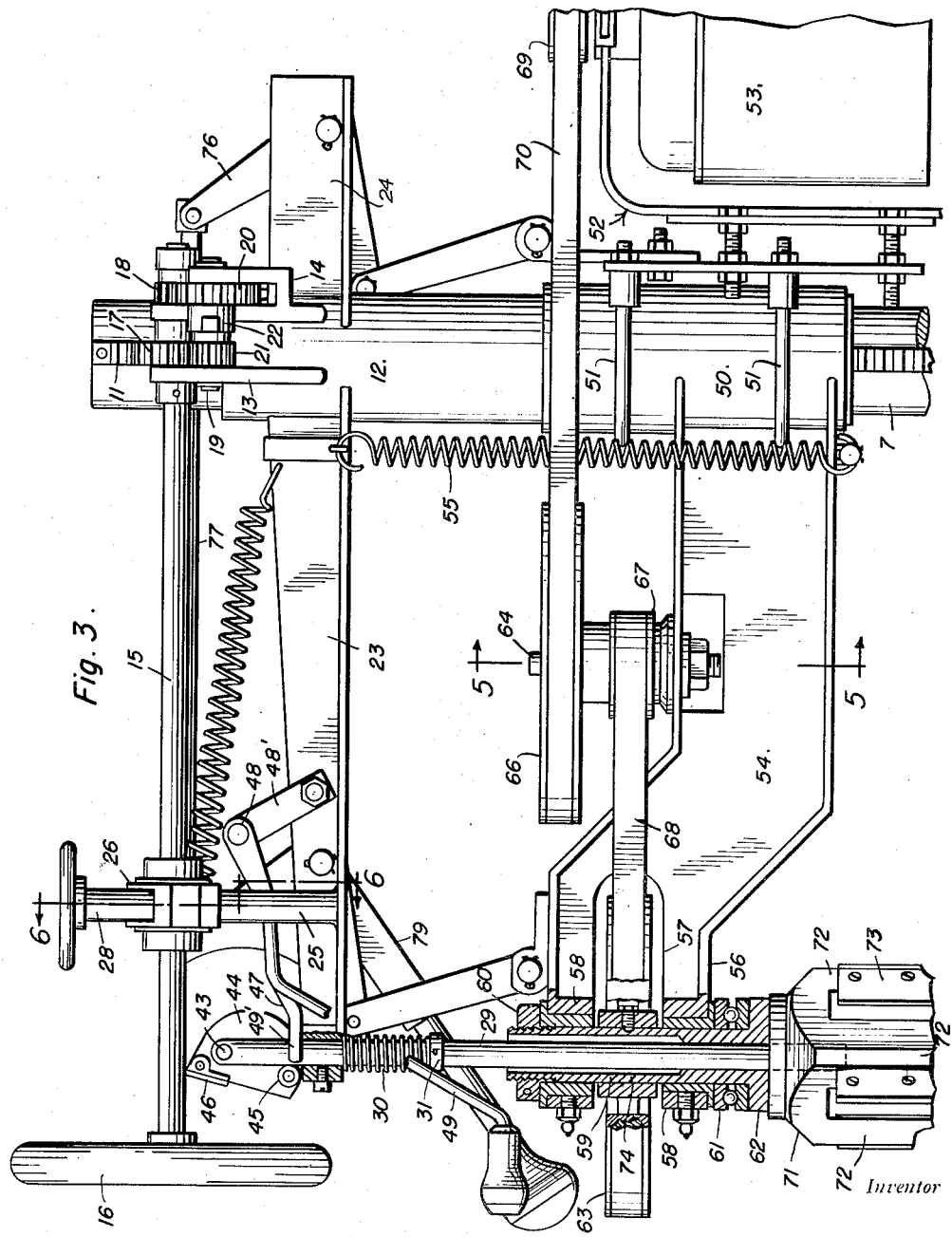

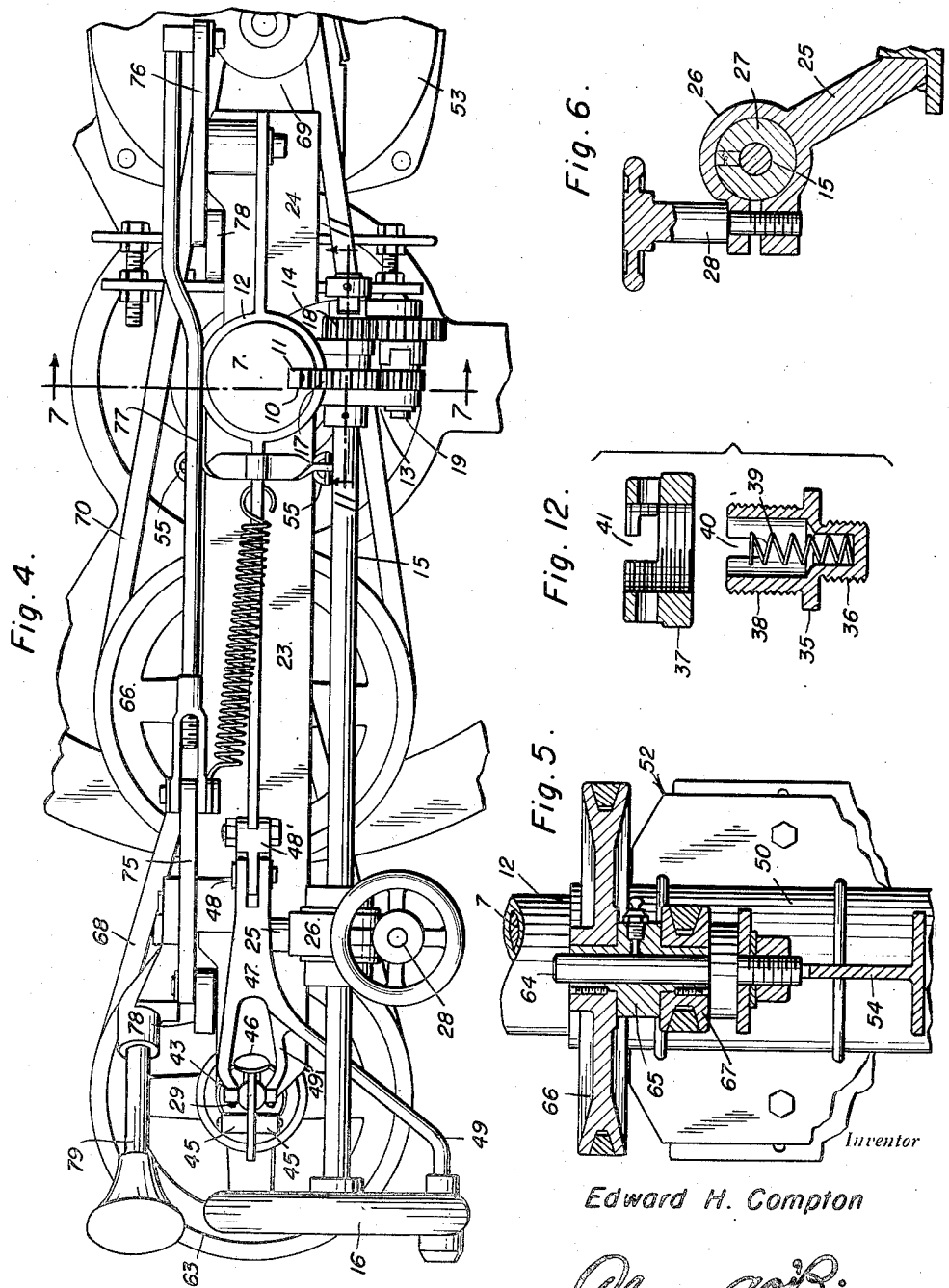

Aug. 21, 1951 — E. H. COMPTON — 2,565,169
CUTTING MACHINE
Filed Dec. 4, 1947 — 5 Sheets-Sheet 5

Edward H. Compton
INVENTOR.
BY
Attorneys

UNITED STATES PATENT OFFICE 2,565,169

CUTTING MACHINE

Edward H. Compton, Akron, Ohio, assignor of one-half to Le Roi Oswald, Akron, Ohio Application December 4, 1947, Serial No. 789,736

8 Claims. (Cl. 164—86)

This invention relates to a machine for cutting, from the inflatable core of a tire curing mold, a section containing the casing of the inflation valve of said core.

Casings of pneumatic vehicle tires are cured in a mold while expanded into contact with the latter by means of an inflatable rubber core. The mold core is provided with an inflation valve whose metallic casing is bonded in the core, and since the metal and rubber have different coefficients of expansion, the adhesion of the core to the valve casing is soon weakened and repair is required. At the present time, a large irregular section containing the valve section is cut by means of a knife from the core by hand, a slow laborious task requiring frequent lubrication of the knife. A molded rubber plug having a valve casing bonded therein is then inserted in the irregular hole thus made in the core, and, due to the non-uniform shapes and sizes of the holes thus made, large and different quantities of uncured rubber are used to fill the spaces between the walls of the holes and the inserted plugs before vulcanizing the latter in place. As a result of this, the plugs are not effectively bonded in place, so that the cores soon require further repair or must be discarded as unfit for further use.

The primary object of the present invention, therefore, is to provide an efficient machine for rapidly cutting, from the inflatable rubber core of a tire curing mold, a uniform substantially cylindrical section of predetermined size and containing the casing of the inflation valve of the core, whereby a cylindrical rubber replacement plug of a standard predetermined size, and having a valve casing bonded therein, may be fitted in the hole left in the core by removal of the section cut therefrom, and whereby such standard plug may be effectively vulcanized to the core without the use of a great quantity of rubber to fill the space between the wall of the hole and the inserted replacement plug.

Another object is to provide means connectible to the valve casing of the core for placing the adjacent portion of the core under tension, so that the cutter may more easily perform its cutting action in severing the section from the core.

A further object is to provide an improved rotary cutter for severing the section from the core, said cutter having four equally spaced blade carrying arms arranged in box formation and to the outer faces of which successive blades are secured in right angular relation and parallel with the axis of rotation of the cutter, whereby, when the cutter is in operation, the cut is repeatedly re-opened and successive cuts are made at uniform intervals of time. Thus, the core material is repeatedly flexed by the cutter so as to permit air to flow past the blades and dissipate heat generated by the cutting operation. A result of this is that the cuttings produced by the cutter are dry and granular, instead of being tacky and acting to seize and chip or break the blades.

Other objects are to provide improved means for mounting and vertically adjusting the cutter to adapt the machine for operation upon mold cores of different cross-sectional sizes; to provide novel means for moving the cutter downwardly to feed it to the work; and to provide a machine of the kind described involving a relatively simple and practical combination and arrangement of organized elements which provides for ready operation and control of the machine by a person standing in front of the machine and the work being operated upon.

The exact nature of the present invention, as well as still further objects and features thereof, will become apparent from the following description when considered in connection with the accompanying drawings, in which:

Figure 2 is an enlarged fragmentary view of the upper portion of the machine shown in Figure 1, partly in side elevation and partly in section.

Figure 3 is a view somewhat similar to Figure 2, looking at the opposite side of the machine and with the cutting unit lowered and the stem of the core tensioning means elevated.

Figure 4 is a fragmentary top plan view of the construction as shown in Figure 3.

Figure 5 is a section taken on line 5—5 of Figure 3, with parts omitted.

Figure 6 is a section taken substantially on line 6—6 of Figure 3, with parts omitted.

Figure 11 is a fragmentary sectional detail taken on line 11—11 of Figure 4.

Figure 12 is an exploded sectional view of the coupling means for connecting the stem of the tensioning means with the valve casing of the mold core.

Figure 13 is a horizontal sectional view taken through the upper portion of the cutter and an adjacent portion of the mold core from which a section containing the inflation valve casing is being cut by the cutter.

Figure 14 is a view similar to Figure 13 taken through the cutter at a lower point.

Figure 1:
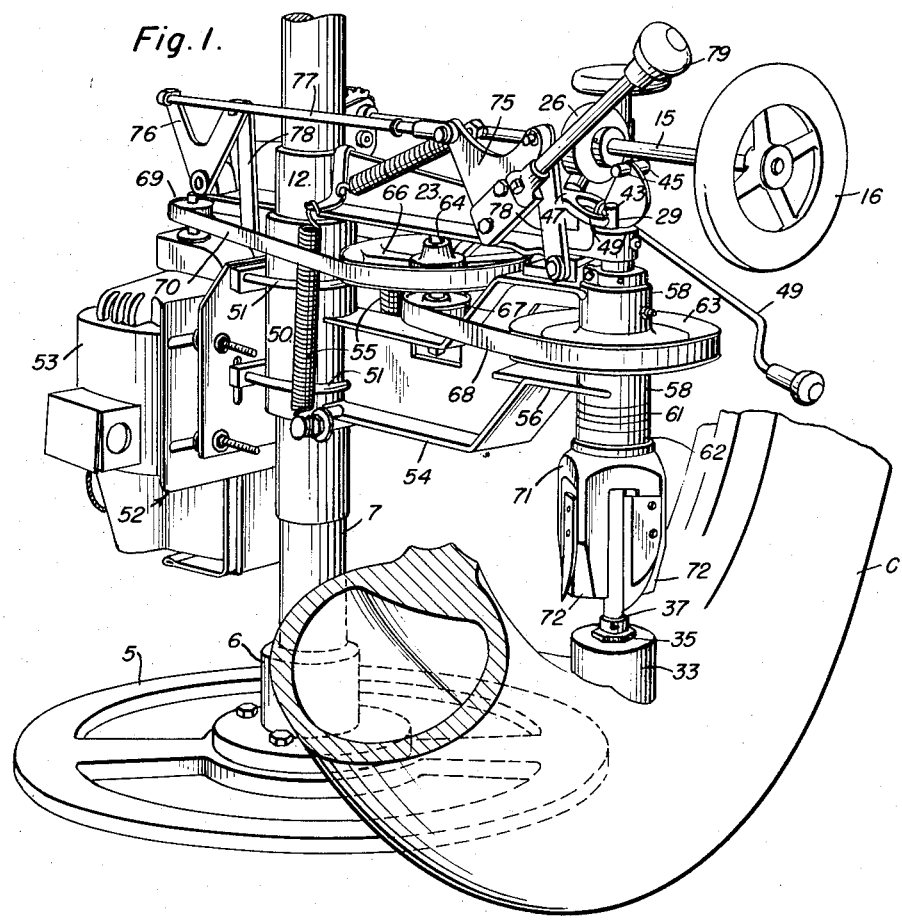
Figure 1 is a front perspective view, partly broken away, showing a cutting machine constructed in accordance with the present invention and illustrating the condition of the machine after it has been used to cut a section from a mold core.
Figure 9:
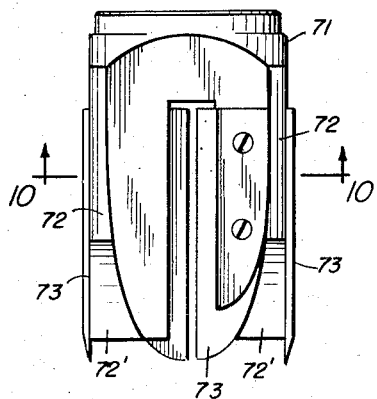
Figure 9 is an enlarged elevational view of the cutter.
Figure 10:
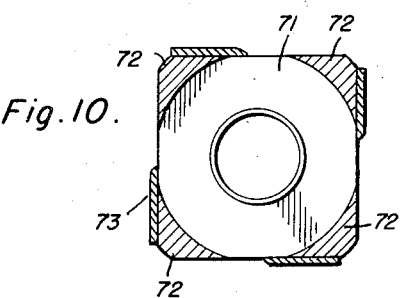
Figure 10 is a horizontal section taken on line 10—10 of Figure 9.
Figure 7:
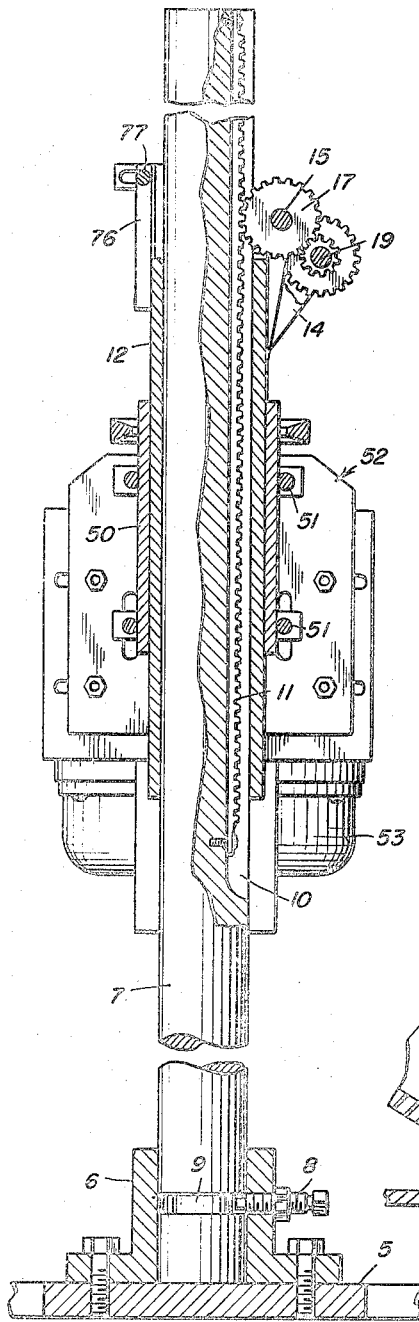
Figure 7 is a view mainly taken on line 7—7 of Figure 4, but with parts broken away and in section and omitted.

Referring in detail to the drawings, the illustrated embodiment of the invention comprises a base plate 5 adapted to be suitably flatly fixed on the top of a bench or the like and having a central hub 6 in which is fitted the lower end of an upright post 7, the post being secured in hub 6 by means of a set screw 8 carried by said hub and engaged in a peripheral annular groove 9 provided in the lower end of post 7. The post 7 has a longitudinal groove 10 in its upper portion, within which is secured a rack bar 11. Slidably fitted on the post 7 is a sleeve 12 provided at one side of its upper end with spaced bearing brackets 13 and 14 in which is journalled the rear end of a horizontal shaft 15 having a handwheel 16 secured on its front end. Journalled on the shaft 15 between the brackets 13 and 14 is a spur gear 17 which meshes with rack bar 11, and secured on said shaft 15 rearwardly of bracket 14 is a pinion 18. An axle 19 is supported by the brackets 13 and 14, and a spur gear 20 and a pinion 21, which are clutched together at 22, are journalled on said axle and respectively meshed with the pinion 18 and gear 17. The pinions 18 and 21 and gear 20 provide a reduction gearing between shaft 15 and gear 17, through which rotation of said shaft will cause vertical adjustment of sleeve 12 on post 7. Rigid with and projecting from opposite sides of the upper end of sleeve 12 is a forwardly projecting relatively long arm 23 and a short rearwardly projecting arm 24. The shaft 15 is disposed above and to one side of, as well as parallel with, arm 23, and projects forwardly of the latter. A short post 25 is carried by arm 23 near the forward end of the latter, and a split resilient brake band 26 is fixed on the upper end of this post. The brake band is normally expanded or released from a brake drum 27 secured on shaft 15, and a clamping screw 28 is provided to contract said brake band into engagement with said drum to hold the shaft 15 from turning and thereby secure the sleeve 12 in any of its vertically adjusted positions. A vertical stem 29 has its upper end slidably keyed in and extended through the forward end of arm 23, and this stem is urged downwardly by a compression spring 30 placed thereon between the arm 23 and an abutment collar 31 secured on stem 29 below the arm 23. A fragment of an inflatable core for a tire curing mold is shown at C, and it has the usual casing 32 of an inflation valve bonded therein as usual. Means is provided to detachably connect the lower end of stem 29 to the valve casing 32 so that the portion of the core adjacent said valve casing may be pulled upwardly and placed under tension during the operation of cutting a section 33 from the core C which contains the valve casing 32. This means includes a cross pin 34 in the lower end of stem 29, a hollow coupling member 35 having a stem 36 adapted to be threaded into the valve casing 32, a coupling cap 37 adapted to be threaded on the body 38 of coupling member 35, and a spring 39 in the coupling member 35, the body 38 having opposed open longitudinal slots 40, and the cap 37 having opposed bayonet slots 41 to receive the ends of cross pin 34 when the slots 40 are registered with the open vertical ends of slots 41. Thus, by turning the cap 37 to move the vertical ends of slots 41 out of register with slots 40, parts of the cap will be moved over the ends of the cross pin 34 to connect the stem to the coupling elements. When the stem 29 enters the coupling member 35, it contacts and compresses spring 39 so that play between the ends of cross pin 34 and coupling cap 37 is opposed by said spring 39.

Figure 8:
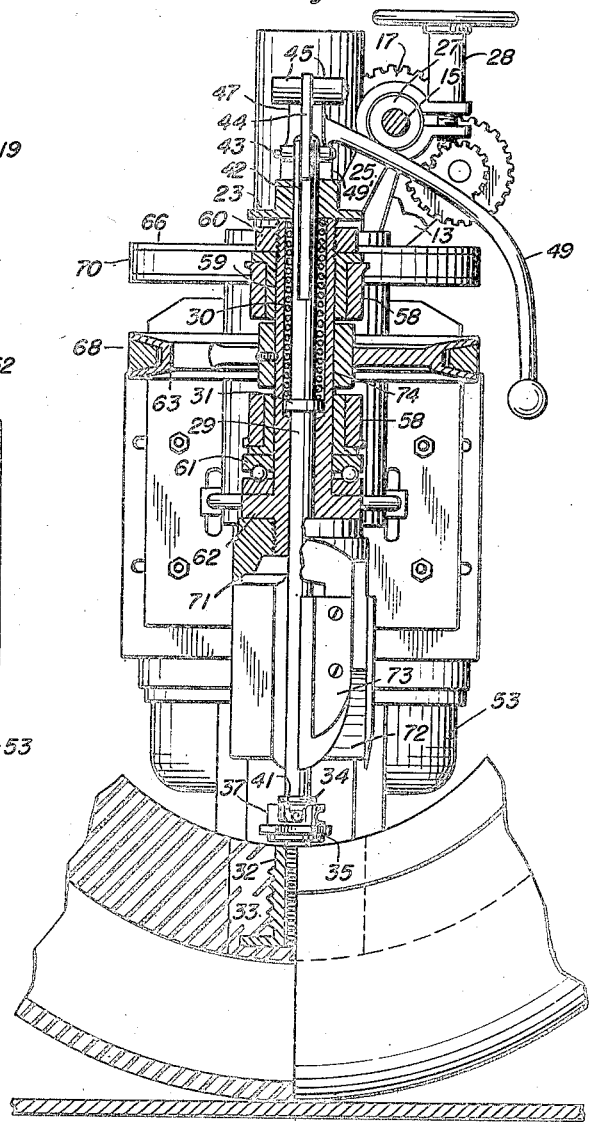
Figure 8 is a vertical section taken substantially on line 8—8 of Figure 2, but with the stem of the core tensioning means coupled to the casing of the inflation valve of a mold core.

An elongated longitudinal slot 42 is provided in the upper end of stem 29 as shown more clearly in Figure 8, and pivoted near one end on a horizontal pin 43 to the upper end of and within the slot 42 of stem 29 is a latch plate 44. The latch plate 44 has side weights 45 on its free end, and a thumb-piece 46 on its pivoted end. When the stem 29 is raised, the latch plate 44 is thrown off-center and gravitates to the position shown in Figure 3, where it rests on arm 23. By swinging the latch plate, it may be used to regulate the travel of stem 29. The stem 29 is raised in cutting position by means of a lever 47 pivotally mounted at 48 on a bracket 48' carried by arm 23, for vertical swinging movement. The lever 47 has an operating handle 49 which extends forwardly and downwardly as well as laterally, and said lever is provided with a forked free end which straddles the stem 29 and which is indicated at 49'. When the lever 47 is swung upwardly, its forked end engages the projecting ends of pin 43 to raise the stem 29 and permit the latch plate 44 to lower. By pressing on the thumb-piece 46, the latch plate 44 may be released so as to allow spring 30 to move the stem 29 downwardly.

Slidably fitted on the lower portion of sleeve 12 is a shorter sleeve 50, on one side of which is clamped, by U-bolts 51, an adjustable mounting bracket 52 for a vertically disposed electric motor 53. A long horizontal arm 54 is fixed to the opposite side of sleeve 50 and extends parallel with and beneath the arm 23. Tension springs 55 provide elastic connections between the inner ends of arms 23 and 54. The arm 54, bracket 52, motor 53 and sleeve 50 form parts of a motor driven cutting unit slidable on post 7 and suspended from the vertically adjustable supporting unit 23, 12, 24, etc., by the springs 55. The arm 54 is of I-beam form and has an upwardly offset forward end portion 56 whose web is provided with an elongated central slot 57, and whose forward terminals are formed with vertically aligned bosses 58 having a tubular spindle 59 journalled therein and retained in place by a nut 60. A thrust bearing 61 is provided between the lower boss 58 and a flange 62 provided on the lower portion of spindle 59, and a large pulley 63 is secured on the spindle 59 and disposed within slot 57. Intermediate its ends, the arm 54 has the lower end of a vertical spindle 64 fixed thereto, and journalled on this spindle is a hub 65 provided with reduced ends on which are secured a large pulley 66 and a small pulley 67. The pulley 63 is aligned with pulley 67 and operatively connected therewith by an endless driving belt 68.

The drive shaft of motor 53 has a small pulley 69 secured thereon in line with pulley 66, and a driving belt 70 passes around these pulleys 69 and 66 to complete a reduction driving connection between the motor and spindle 59. Secured on the lower end of spindle 59 is a cutter including a head 71 having four equally spaced parallel prongs 72 arranged in box formation about and parallel with the axis of rotation of the cutter, and blades 73 secured to the outer faces of said prongs so that successive blades are disposed in right angular relation. The lower portions 72' of the prongs 72 are inwardly tapered to provide clearance for cuttings. The stem 29 slidably extends through the spindle 59 into head 71, and maintains alignment of arms 23 and 54. When the motor driven cutting unit is raised and the stem 29 is lowered as in Figures 1 and 2, the lower end of stem 29 projects below the cutter to permit ready connection of stem 29 to or disconnection of the same from the valve casing 32, respectively before and after cutting section 33 from the core C. As shown in Figures 2, 3 and 8, the upper portion 74 of the bore of spindle 59 is of sufficient diameter to receive the spring 30 and abutment collar 31 when the motor driven cutting unit is raised.

Means is provided for manually forcing the cutting unit downwardly to feed the cutter to the work. This means includes vertical bell-crank levers 75 and 76 respectively pivoted on the front portion of arm 23 and on the arm 24, a link 77 connecting one arm of lever 75 to one arm of lever 76, links 78 connecting the other arms of levers 75 and 76 to the cutting unit, and a handle 79 fixed to and extending forwardly from the lever 75. By rocking the lever 75 forwardly, the links 78 are caused to move down and to force the cutting unit down so as to feed the cutter to the work disposed on the bench beneath said cutter as shown in Figures 1 and 8. The vertical adjustment of the supporting unit by operation of shaft 15 is required to properly set the cutting unit at different heights in accordance with the different cross-sectional sizes of different mold cores. It is noted that the weight of parts disposed at one side of post 7 is substantially counterbalanced by the weight of the motor 53 disposed at the opposite side of said post.

The machine is operated in a manner somewhat similar to a drill press. The mold core is placed upright on the bench with its inflation valve casing directly under the cutter, the cutting unit being in the raised position of Figures 1, 2 and 8. The lower end of stem 29 is then coupled to the air valve casing, and the stem 29 is raised to place the portion of the mold core adjacent the inflation valve casing under vertical tension. Handle 79 is then manipulated to feed the cutter downwardly to the work, the motor 53 having previously been placed into operation for driving the cutter. Also, the height of the supporting unit will have been previously adjusted in accordance with the size of the mold core being operated upon, such adjustment being effected by actuation of shaft 15 upon release of brake band 26. The adjustment is, of course, secured by tightening the band 20 before the cutting operation is actually started. The weight of the cutting unit is taken by the springs 55, so that the pressure actually required for feeding the cutting unit downwardly is only that necessary to press the knives into the rubber. As soon as the section 33 is completely severed from the mold core, the cutting unit is raised so that the lower end of stem 29 is exposed therebeneath. The section 33 may then be readily uncoupled from the stem 29 so that it may be removed preparatory to placing a standard replacement plug in the hole left by removal of the section 33.

I am aware that various hand tools or plug cutters have been devised to remove valves from air bags and the like, while the rubber of the latter is in compression. Use of such tools or cutters require exerting pressures thereon ranging from fifty to two hundred pounds per foot. In performing a cutting operation in this old way and by such old means, the rubber is placed under compression, and considerable heat is generated by friction. As a result of this, much power is required and the rubber becomes tacky so as to grip the cutter and even cause stalling or breaking thereof. By the use of the present cutter and means for placing the rubber under tension during the cutting operation, these objections are overcome. The cutter repeatedly stretches and releases the rubber and provides separated spaces through which air may flow past the blades to dissipate any heat generated. In practice, use of the present machine has been found to produce cuttings which are dry and granular, and the blades have been found to only heat to a relatively slight extent even though no lubricant is used on the blades. The cutting operation is performed easily and speedily, and a uniform hole is left by removal of the section of the core, so that standard sized replacement plugs can be employed in repairing the mold core, effectively.

From the foregoing description, it is believed that the construction, operation and advantages of the present invention will be readily understood and appreciated by those skilled in the art. Modifications and changes in details of construction are contemplated, such as fairly fall within the spirit and scope of the invention as claimed.

Having described the invention, what is claimed as new is:

1. A machine for cutting, from the inflatable core of a tire-curing mold, a section containing the casing of the inflation valve of said core, comprising a supporting unit including a stationary member, a vertically movable cutting unit disposed beneath said stationary member of the supporting unit and including a supporting member carrying a rotary cutter rotatable on a vertical axis and a driving motor for said cutter, yieldable means suspending the cutter unit from said stationary member of the supporting unit, manually operable means operating between said stationary member and said supporting member to force the cutting unit downwardly to feed the cutter to work disposed therebeneath, a stem movable axially through the cutter and having means to connect the same with the inflation valve casing, and means to raise said stem for placing the portion of the mold core adjacent to said inflation valve casing under tension.

2. The construction defined in claim 1 together with a spring urging said stem downwardly, said stem being vertically slidable through said stationary member of the supporting unit, and means for regulating the travel of said stem.

3. The combination of claim 2 and said means for regulating the travel of said stem comprising a vertical latch plate pivoted off-center to the upper end of said stem and coacting with said stationary member.

4. The combination of claim 3 and said latch plate being weighted to gravitate to a position for holding the stem in an upward position when the latter is raised, and means for raising said stem.

5. In a machine of the character described, a motor driven cutter mounted for rotation on a vertical axis and comprising a head having four equally spaced parallel depending prongs arranged in box formation about and parallel with the axis of rotation of the cutter, and blades extending below and being secured to the outer faces of said prongs so that successive blades are disposed in right angular relation.

6. In a machine for cutting apertures in rubber, a rotatably driven cutter, means for forcing said cutter axially through a body of rubber, said cutter comprising a rotatable head having a plurality of spaced axial projections, a plurality of cutting blades secured to said projections and having side and terminal cutting edges, portions of said projections having a radius greater than the radius of the side cutting edges of the blades with respect to the axis of the cutter head to maintain the rubber surrounding the aperture formed by said cutting blades under tension as the cutting blades are rotated and forced through the rubber.

7. In a machine for cutting apertures in rubber, a rotatably driven cutter, means for forcing said cutter through a body of rubber, said cutter comprising a rotatable head, a plurality of cutting blades secured to said head and having side and terminal cutting edges, portions of said head having a radius greater than the radius of the side cutting edges of the blades with respect to the axis of the cutter head to maintain the rubber surrounding the aperture formed by said cutting blades under tension as the cutting blades are rotated and forced through the rubber.

8. In a machine for cutting apertures in rubber, a rotatably driven cutter, means for forcing said cutter through a body of rubber, said cutter comprising a rotatable head, a plurality of cutting blades secured to said head and having side and terminal cutting edges, portions of the head between adjacent cutting blades having a radius greater than the radius of the side cutting edges of the blades with respect to the axis of the cutter head to maintain the rubber surrounding the aperture formed by said cutting blades under tension as the cutting blades are rotated and forced through the rubber.

EDWARD H. COMPTON.

REFERENCES CITED

The following references are of record in the file of this patent:

UNITED STATES PATENTS

| Number | Name | Date |
|---|---|---|
| 1,046,394 | Kolassa | Dec. 3, 1912 |
| 1,622,256 | Stevens | Mar. 22, 1927 |
| 1,731,010 | Krause | Oct. 8, 1929 |
| 1,768,328 | Nichols | June 24, 1930 |
| 1,781,274 | De Roo | Nov. 11, 1930 |
| 1,876,775 | Smith | Sept. 13, 1932 |
| 2,067,456 | Meisel | Jan. 12, 1937 |
| 2,121,957 | Fleischli | June 28, 1938 |
| 2,167,279 | Manny | July 25, 1939 |
| 2,272,895 | Stevens | Feb. 10, 1942 |
| 2,356,046 | Garlick | Aug. 15, 1944 |
| 2,426,275 | Krebs | Aug. 26, 1947 |
| 2,440,213 | Spring | Aug. 20, 1948 |

FOREIGN PATENTS

| Number | Country | Date |
|---|---|---|
| 410,412 | Great Britain | May 17, 1934 |